G. BAILLIO.
PROCESS FOR PRODUCING SODIUM SILICATE AND HYDROGEN.
APPLICATION FILED MAY 21, 1915.
1,178,205. Patented Apr. 4, 1916.
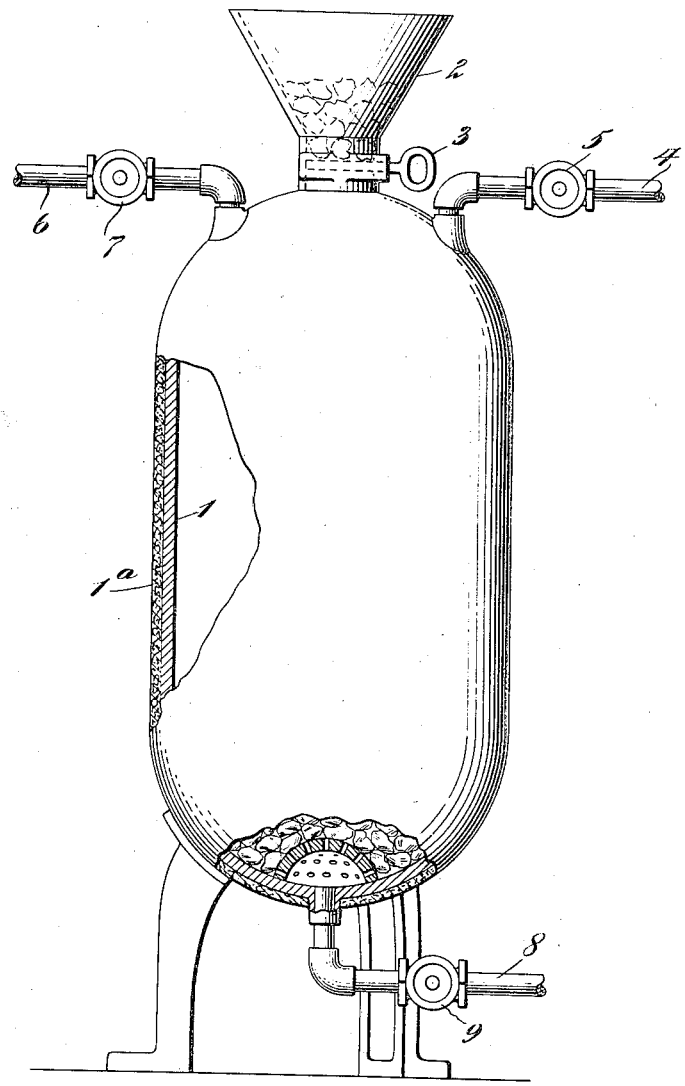

UNITED STATES PATENT OFFICE.

GERVAIS BAILLIO, OF NIAGARA FALLS, NEW YORK, ASSIGNOR TO CASTNER ELECTROLYTIC ALKALI COMPANY, A CORPORATION OF VIRGINIA.

PROCESS FOR PRODUCING SODIUM SILICATE AND HYDROGEN.

1,178,205.   Specification of Letters Patent.   Patented Apr. 4, 1916.

Application filed May 21, 1915. Serial No. 29,480.

*To all whom it may concern:*

Be it known that I, GERVAIS BAILLIO, a citizen of the United States, residing at the city of Niagara Falls, in the county of Niagara and State of New York, have invented certain new and useful Improvements in Processes for Producing Sodium Silicate and Hydrogen, of which the following is a full, clear, and exact description.

This invention relates to a process for producing sodium silicate and hydrogen, and has for its object the production of these substances in a pure state by a simple process which may be carried on commercially on a large scale and at a comparatively low cost.

It is also the purpose of the invention to provide a process by which the production of sodium silicate and hydrogen may be carried on continuously.

Heretofore a common method of making sodium silicate has been to fuse together silica occurring as sand or powdered quartz with a determined amount of soda ash until the conversion of the silica into sodium silicate is complete. This method, however, requires the expenditure of a great quantity of heat in fusing, and moreover, after the fusing is complete it is then necessary to crush the fused mass and boil it with water for several hours to bring the sodium silicate produced into solution in the form of a thick syrupy liquid in which condition it is generally used and marketed.

Another common process of preparing sodium silicate has been to boil a solution of caustic soda and silica in the form of crushed quartz until all of the silica is changed into sodium silicate, the reaction taking place in a closed vessel in which a pressure of approximately 60 lbs. is maintained and the boiling continued from 10 to 12 hours. This method of producing the silicate will give a product in the form of a thick syrupy liquid in condition to be marketed, but the cost and expense of maintaining the pressure within the closed vessel and the continued boiling of the solution are objectionable from a commercial standpoint.

Until recently the production of metallic silicon has been confined to the laboratory, but a process has now been devised for commercially producing this product and it is the purpose of my invention to utilize this commercially produced metallic silicon in the production of sodium silicate.

Broadly speaking, my invention consists in reacting upon metallic silicon with caustic soda and water to produce pure sodium silicate and simultaneously with the formation of the silicate to produce pure hydrogen gas which may also be collected and sold. The market value of the two products which are thus produced in pure state, warrant the expenditure entailed in using metallic silicon as the basis of the process.

In order to obtain the best results, the process is carried out in a closed vessel and the metallic silicon is utilized in small lumps about the size of a walnut or egg. About a 10% solution of caustic soda is used as it has been determined that with this strength of solution the reaction takes place readily resulting in a rapid generation of the hydrogen gas and the formation of pure sodium silicate, the reaction taking place as shown in the following equation:

$$Si + 2NaOH + H_2O = Na_2SiO_3 + 2H_2.$$

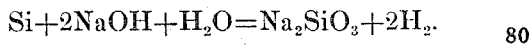

When the metallic silicon used is in small lumps, no extra heat is necessary as the reaction between it and a cold caustic soda solution starts immediately and the endothermic heat evolved is sufficient to maintain the reaction. After the generation of hydrogen gas ceases; *i. e.* after all of the sodium hydroxid has been converted into sodium silicate, the pure silicate solution is then drawn off and is ready for the market; the hydrogen gas produced is also collected by conducting it from the closed vessel to any suitable reservoir. An excess of metallic silicon is preferably used and after the sodium silicate is removed from the vessel a fresh solution of caustic soda is run in and the production of the sodium silicate and hydrogen thus continued.

The method may also be carried on by mixing metallic silicon and caustic soda and placing the same within the vessel and thereafter adding water. In this instance also, it is desirable that an excess of metallic silicon be present to insure that all of the caustic soda will be converted into sodium silicate.

Referring now to the drawings, I have illustrated somewhat diagrammatically an apparatus by which the process may be carried on.

A closed vessel 1 of any suitable material is preferably covered with asbestos 1ª or like material, which prevents the radiation of heat from the walls of the same. Mounted upon the top of the vessel and communicating with its interior is a hopper 2 in which the metallic silicon, in preferably small lumps, is placed, the feeding of the silicon to the vessel being controlled by a slide valve 3, which normally remains closed. Also leading from the top of the vessel is a pipe 4 through which a solution of caustic soda flows to the vessel from any suitable tank or reservoir which flow is controlled by the valve 5. The hydrogen gas generated is conducted from the closed vessel by means of a pipe 6, which may, if desired, be also controlled by a valve 7 and the solution of sodium silicate produced is drawn from the bottom of the tank through a suitable pipe 8 which is also controlled by means of a valve 9, which remains closed until all of the caustic soda has been converted into sodium silicate; or in other words, until the generation of hydrogen has ceased. The excess of silicon within the vessel is prevented from passing out with the sodium silicate solution by means of a strainer placed over the mouth of the pipe 8.

The steps of the process according to the preferred procedure are in detail as follows: An excess of metallic silicon, preferably in small lumps, is dumped into the closed vessel by opening the valve 3 after which this valve is closed, the valve 5 in the pipe 4 is opened and the solution of sodium hydroxid is run into the vessel. As stated a 10% solution is preferably used. An amount of the solution which will almost fill the tank is permitted to enter and the valve 5 is then closed. The generation of pure hydrogen gas starts immediately which may be conducted through the pipe 6 to any suitable holder. After the generation of the hydrogen gas has ceased, all of the sodium hydroxid has been converted into pure sodium silicate, and this silicate solution is drawn off through the pipe 8 at the bottom of the vessel. The vessel is again filled with a solution of sodium hydroxid and a similar reaction again takes place, and from time to time the valve 3 controlling the hopper is opened and a quantity of metallic silicon fed into the closed vessel so as to maintain an excess of the silicon within the vessel at all times. It will therefore be seen that the production of pure sodium silicate may be carried on continuously, and simultaneously with its production, pure hydrogen gas will be generated both of which may be collected and utilized, making the process commercially feasible, since there is a ready market for both products. The reaction is more rapid when the caustic soda solution is hot for which reason the walls of the vessel are covered with a heat insulator, such as asbestos, which will prevent the heat evolved in the endothermic reaction from being dissipated by radiation from the walls of the vessel.

The process may also be carried on by using a mixture of the silicon and caustic soda containing an excess of silicon in the hopper 2 and utilizing the pipe 4 for a water supply, in which instance it is preferable to add calculated quantities of caustic soda and water to obtain the proper strength of solution, otherwise the process is the same as that before described.

I claim:

1. A process of producing sodium silicate and hydrogen which comprises reacting in a closed vessel upon caustic soda and water with metallic silicon in an amount in excess to that necessary to convert the caustic soda into sodium silicate, collecting the hydrogen gas and sodium silicate produced and then repeating the operation while maintaining the excess of silicon in the vessel.

2. A process of producing sodium silicate and hydrogen which comprises reacting in a closed vessel upon a caustic soda solution with an excess of metallic silicon, collecting the hydrogen gas and sodium silicate produced, and then reacting upon the remaining metallic silicon within the vessel with a fresh solution of caustic soda.

In witness whereof, I subscribe my signature, in the presence of two witnesses.

GERVAIS BAILLIO.

Witnesses:
ROBERT E. MCCONNELL,
CHAS. A. MCRORY.